US006661784B1

(12) United States Patent
Nykänen

(10) Patent No.: US 6,661,784 B1
(45) Date of Patent: Dec. 9, 2003

(54) METHOD IN A COMMUNICATION NETWORK AND A COMMUNICATION DEVICE

(75) Inventor: Petri Nykänen, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/260,105

(22) Filed: Mar. 2, 1999

(30) Foreign Application Priority Data

Mar. 3, 1998 (FI) .................................................. 980485

(51) Int. Cl.[7] .............................................. H04L 12/28
(52) U.S. Cl. ........................ 370/338; 370/389; 370/409
(58) Field of Search ........................ 370/338, 352–356, 370/382, 397, 389, 400, 401–406, 409, 471, 474, 475, 254, 270, 395, 392; 709/203, 219, 245; 379/88.12, 88.19; 455/406, 422, 410, 411

(56) References Cited

U.S. PATENT DOCUMENTS

| | | | |
|---|---|---|---|
| 5,227,778 A | | 7/1993 | Vacon et al. ............ 340/825.52 |
| 5,487,100 A | * | 1/1996 | Kane ......................... 340/7.23 |
| 5,499,343 A | | 3/1996 | Pettus ...................... 395/200.2 |
| 5,502,726 A | | 3/1996 | Fischer ....................... 370/94.1 |
| 5,519,706 A | * | 5/1996 | Bantz et al. ................ 370/329 |
| 5,602,854 A | | 2/1997 | Luse et al. .................. 370/313 |
| 5,623,605 A | * | 4/1997 | Keshav et al. .............. 370/392 |
| 5,627,829 A | * | 5/1997 | Gleeson et al. ............. 370/230 |
| 5,642,515 A | | 6/1997 | Jones et al. ................. 395/727 |
| 5,682,379 A | | 10/1997 | Mahany et al. ............. 370/311 |
| 5,754,774 A | | 5/1998 | Bittinger et al. ........ 395/200.33 |
| 5,793,630 A | * | 8/1998 | Theimer et al. ......... 340/10.42 |
| 5,802,469 A | | 9/1998 | Nounin et al. .............. 455/422 |
| 6,052,372 A | * | 4/2000 | Gittins et al. ............... 370/396 |
| 6,070,076 A | * | 5/2000 | Valentine .................... 455/436 |
| 6,078,575 A | * | 6/2000 | Dommety et al. .......... 370/338 |
| 6,078,789 A | * | 6/2000 | Bodenmann et al. ....... 370/470 |
| 6,236,658 B1 | * | 5/2001 | Essbaum et al. ............ 370/401 |
| 6,330,244 B1 | * | 12/2001 | Swartz et al. ............... 370/401 |
| 6,360,257 B1 | * | 3/2002 | Rydberg et al. ............ 709/223 |
| 6,400,941 B1 | * | 6/2002 | Nara .......................... 455/422 |

FOREIGN PATENT DOCUMENTS

| | | |
|---|---|---|
| EP | 0 869 688 A2 | 10/1998 |
| GB | 2 309 558 | 7/1997 |
| WO | WO 98/00951 | 1/1998 |

OTHER PUBLICATIONS

IEEE Personal Communications, vol. 4, No. 5, Oct. 1997, Bennett et al., "Piconet: Embedded Mobile Networking".pp. 8–15.
WAP Architecture Draft Version 0.9(Sep. 1997) "Wireless Application Protocol Architecture Specification".
Finnish Official Action and English translation thereof.

* cited by examiner

Primary Examiner—Nguyen T. Vo
Assistant Examiner—Jean A Gelin
(74) Attorney, Agent, or Firm—Perman & Green, LLP

(57) ABSTRACT

The invention relates to a method for setting up a data transmission connection which is formed for transmitting information between at least a first communication device (1, 6–15, 300a, 300b, 400, 401) and a second communication device (1, 6–15, 300a, 300b, 400, 401), in which method, for at least the first communication device (1, 6–15, 300a, 300b, 400, 401), a network address (321a, 321b) is selected that is advantageously used for identifying the first communication device (1, 6–15, 300a, 300b, 400, 401). In the method according to the invention, for at least one service of at least the first communication device (1, 6–15, 300a, 300b, 400, 401), an address information (320a, 320b) is formed, which is advantageously used for identifying the service, and between the network address (321a, 321b) of the first communication device (1, 6–15, 300a, 300b, 400, 401) and the address information (320a, 320b) of the service, a correspondence is arranged for transferring information between the first communication device (1, 6–15, 300a, 300b, 400, 401) and the second communication device (1, 6–15, 300a, 300b, 400, 401).

21 Claims, 7 Drawing Sheets

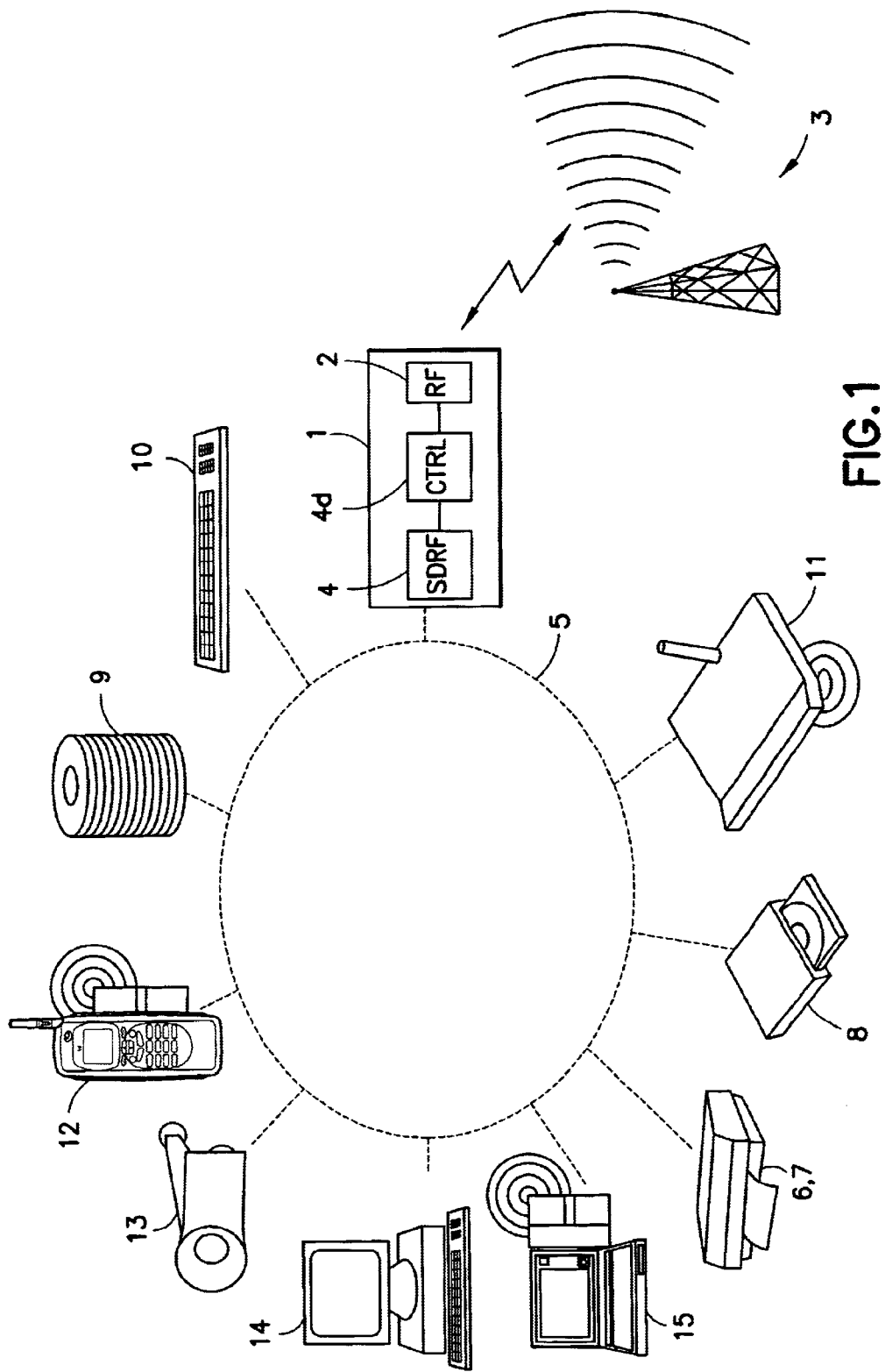

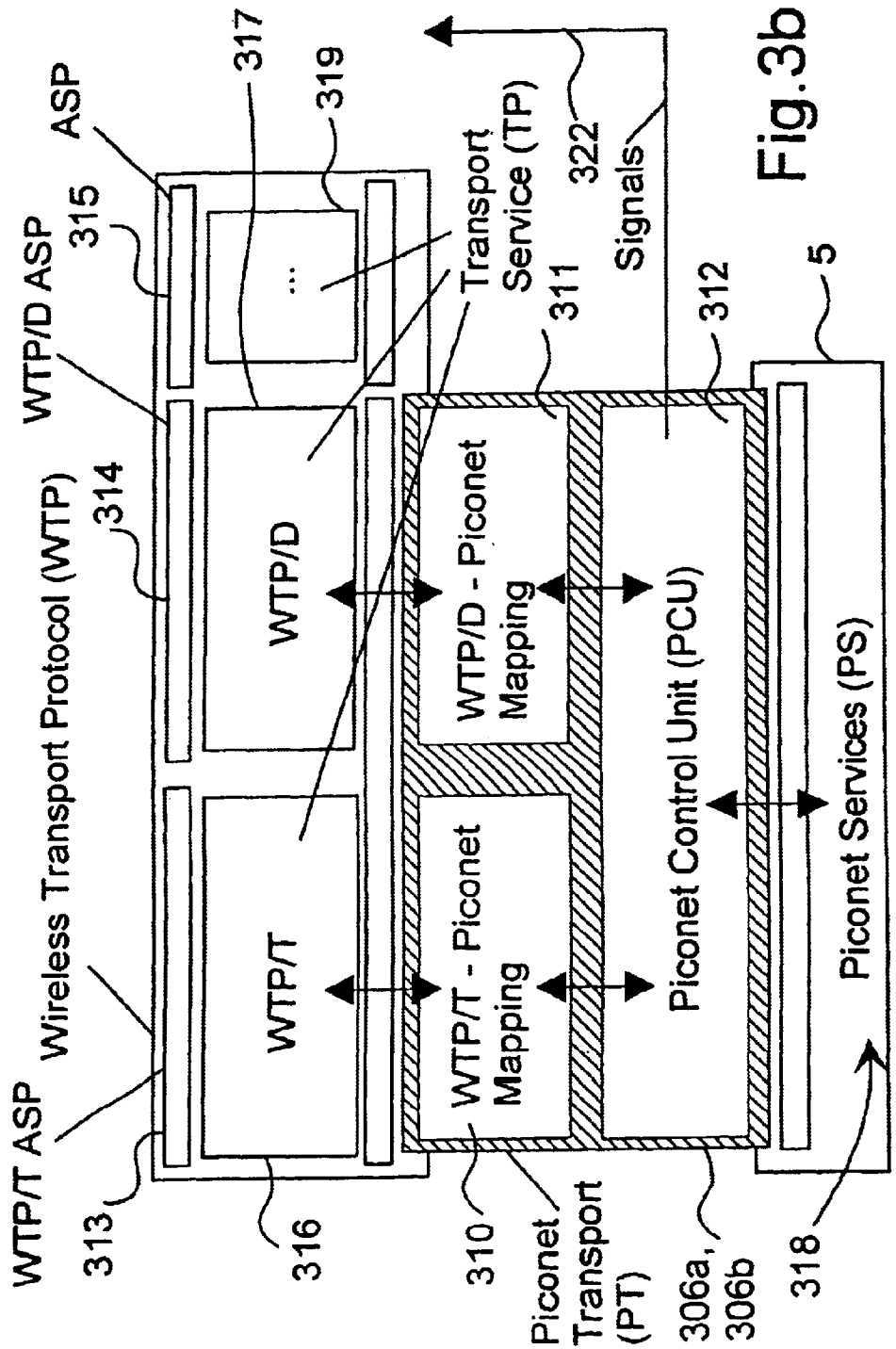

METHOD IN A COMMUNICATION NETWORK AND A COMMUNICATION DEVICE

BACKGROUND OF THE INVENTION

The present invention relates to a method for setting up a data transmission connection as set forth in the preamble of claim 1. The invention relates also to a communication device as set forth in the preamble of claim 10.

Local area networks usually consist of one or more server computers as well as work stations and other peripheral devices communicating with the same, such as printers and telecopiers. Communication in a local area network is usually implemented in a wired manner, e.g. by Ethernet cabling. Also wireless local area networks are known, where data transmission is implemented by means of radio modems, thereby reducing limitations relating to the placement of cabling, number of connection points and their positioning in a wired local area network.

In local area networks, each peripheral device coupled to the local area network has an address identifying the peripheral device, i.e. client, whereby data is directed to this peripheral device. On the other hand, information from the peripheral device is recognised by the server on the basis of the address of the peripheral device. The peripheral device and the server are equipped with a network adapter determined on the basis of the physical structure of the local area network used at the time, comprising means for receiving messages from the local area network and for transmitting messages to the local area network.

Communication between different communication devices in local area networks usually takes place as data transmission based on messages. A message consists of address data and the actual information to be transmitted. The address data is used for directing messages to the correct device and, on the other hand, for identifying the device that transmitted the message.

Wireless local area networks differ from wired ones primarily in that the data transmission takes place by using a wireless communication method, e.g. by means of radio waves, infrared or inductive data transmission. In the operation, wireless local area networks are typically star networks, i.e. information is transmitted between a server device and a peripheral device. Thus, the information to be transmitted between peripheral devices is conducted from the transmitting peripheral device to the server device which transmits the information further to the receiving peripheral device.

In view of the operation of the local area network, the server device must know which peripheral devices are coupled to it at each time and what is the operating status of these peripheral devices. This can be implemented by using, for example, the above-mentioned communication based on messages, whereby in connection with turning on and a possible change of state, the peripheral device transmits a message to the server device. The server device receives the message and examines the information content of the message.

A local area network is suitable for use e.g. in offices, whereby data is transmitted by using a compact data processor with a sufficient storage capacity. An example of such a portable device is the Nokia 9000 Communicator which can be used both as a mobile station and as a data processor.

When using a wired communication network, also a portable data processor can be connected with a local area network by means of a network interface card, known as such and comprising means for setting up a data transmission connection between the local area network and the portable device. To portable data processors, it is possible to connect different peripheral devices directly without the need of a local area network. The connection can also be based on wireless techniques, usually the infrared technique (IR). By coupling such a peripheral device to a portable data processor or the like, the data of the peripheral device in question in the data processor must be configured before the peripheral device can be used.

Data transmission between different communication devices, such as servers and the clients of servers, in so-called piconets often takes place by means of short distance infrared (IR) data transmission, low power radio frequency (LPRF) data transmission, short distance radio frequency (SDRF) or inductive data transmission, whereby the data transmission distances within the local area network consisting of a single piconet are typically only a few metres or dozens of metres.

In addition to local area networks, wide wireless communication networks are known, such as the public land mobile network (PLMN) which is a communication network based on a cellular system. As an example, one could mention the GSM-900 mobile communication network based on the GSM system (Global System for Mobile Communication). The cells of the communication network are distributed in a wide geographical area, and mobile stations (MS), such as mobile phones, which communicate with the communication network by means of base stations (BS), move from one cell to another. These mobile stations are separated from each other by means of a subscriber-specific identification code, whereby data transmission between two mobile stations, such as data transfer or an audio call, is possible. The identification code used is e.g. the IMSI code (International Mobile Subscriber Number). The communication network takes care of routing information between base stations and mobile services switching centres (MSC) by utilising registration data on the location of the mobile station in the area of the cells of different base stations. Wireless communication networks include also GSM-1800, GSM-1900, PDC, CDMA, US-TDMA, IS-95, USDC (IS-136), iDEN (ESMR), DataTAC, and Mobitex.

For completing data transmission and processes related to data transmission by data processors connected in a local area network, such as servers and clients, for example peripheral devices and possibly also wireless communication devices, there must be a collection of communication rules available, determining the allowed messages and the operation of the communicating parties at different stages of the communication.

One such collection of communication rules is, in a known manner, a protocol, i.e. a practice whereby devices communicate with each other. For data transmission particularly in wireless communication networks, a wireless application protocol (WAP) has been developed, and this will be used as an example in the following description. In a known manner, one version of the WAP application protocol is described e.g. in the publication WAP Architecture Draft Version 0.9 (1997–09) published in the Internet network, describing e.g. the architecture of the WAP application protocol. By means of the WAP application protocol, it is possible to define a series of protocols at different levels, whereby it is possible to develop new services and devices for present and future wireless communication networks, e.g. mobile communication networks based on a digital cellular network. The WAP application protocol has been already developed e.g. for the short messaging service (SMS), unstructured supplementary service data (USSD), circuit switched data (CSD) and global packet radio system (GPRS) services of the GSM network.

SUMMARY OF THE INVENTION

It is an aim of the present invention to achieve a system that, by means of a local area network, makes connections to data processors, such as servers, clients of the servers, or them both, possible for conducting data transmission. The purpose of the invention is particularly to define a system for communication between a WAP server and a WAP client complying with the WAP application protocol in the area of a piconet utilising IR or SPRF services and utilising this piconet. The method of the invention is characterised in what will be presented in the preamble of the appended claim 1. The communication device of the invention is characterised in what will be presented in the preamble of the appended claim 10.

The application layer of the architecture of the above-mentioned WAP application protocol applies a defined wireless application environment (WAE) architecture. The different WAE applications of communication devices follow closely the protocol used in the Internet World Wide Web (WWW), where different applications and information is presented by means of standardised presentation formats which are browsed e.g. by means of known WWW browsers. Thus, the servers and information in the WWW network are named according to a Uniform Resource Locator (URL) address complying with the Internet standard and independent of the location, and the information presentation format is one that is supported by the browser used, for example Hyper Text Markup Language (HTML) or JavaScript.

It is an advantage of the method according to the invention to make it possible for the clients and servers of the local area network, the clients and servers of another local area network, and particularly the clients and servers temporarily within the area of the local area network to communicate and to use different services. This results from the elimination of drawbacks caused by differences in the addresses and addressing used in different communication networks. For example, the addressing of different nodes in a piconet differs from the addressing of nodes applying the WAP application protocol, whereby it is necessary to map the address used by the WAP application protocol to the corresponding address used by the piconet or to a temporary address created by the piconet.

By means of said mapping, a correspondence is established between e.g. so-called logical addresses, such as URL addresses, used by WAP applications, and physical addresses of the network, i.e. network addresses, used by the piconet. The network address is typically a nonstandardised network-specific numerical code which is reserved for a device by the server for creating the network and which is only useful in the area of said network. A logical address indicates in this context also the address of clients, i.e. communication devices, which is typically independent of the location and by means of which the communication device can be identified even in several different communication networks, in which the communication device is arranged to be operable. It should also be noticed that clients as well as services can be independent of the physical communication device, whereby the logical address can only be used to indicate e.g. a service, irrespective of the communication device where it is located. The communication network must thus take care of the addressing also for finding the correct device.

The invention gives significant advantages to both local area networks of prior art, based on short distance data transmission, and mobile communication networks based on a cellular network. For example, by using piconets applying the method, it is possible to create entirely novel local area network systems and local area network services which may include local access points e.g. to airport servers for inquiring flight schedules, retrieving airport services by means of pull-type data transmission, and information delivery by means of push-type data transmission to the communication devices of clients of the server in the area of the piconet.

Other possibilities include information delivery to the communication devices of clients by broadcast-type data transmission, remote control of PC systems in a piconet, and local connection points to gateway servers, whereby the connections e.g. to the Internet network and retrieving information from the Internet network is possible. Further, one could mention a guiding system based on the location of the client in the piconet, whereby the client is guided from one piconet to another. This is based on the small size of the coverage area of the piconet, whereby the location of the client placed in it is known relatively well.

The piconets described above are more suitable than a mobile communication network, such as the GSM network, to be used particularly for utilising the precise location of the client e.g. in connection with guiding systems or when the network operator offers services dependent on the location of the client. Piconets can be used also when it is desired that the client is not charged for data transmission for using services of the communication network as is usually the case in mobile communication networks. In case of circuit-switched data transmission, the open connection complying with the WAP application protocol usually prevents other communication by the communication device, such as ordinary audio calls, which can be avoided by using piconets.

According to an advantageous embodiment of the method of the invention, WAP servers and gateway WAP servers can announce their existence to WAP clients, such as wireless mark-up language (WML) browsers, which are transferred to the area of the piconet where also the WAP server or gateway WAP server is placed. Furthermore, the WAP servers can detect when a WAP client has moved into the area of the piconet, whereby push-type data transmission can be started by the WAP server.

According to another advantageous embodiment of the method of the invention, WAP clients can detect different WAP servers in the piconet into whose area the WAP client has moved. Thus, WAP clients operating in also other communication networks, such as a mobile communication network, can select the piconet as the communication network to be used and select e.g. the IR or LPRF data transmission mode. Thus, the communication devices of WAP clients can alternatively use the piconet for data transmission.

The method of the invention gives also the advantage of reduced data transmission costs, if the use of services in the piconet is free or the use of services has a very inexpensive charge. Furthermore, the power consumption of the communication devices can be lower in the piconet, because the piconet is typically a communication network with a small transmission output power and consequently a short range.

A further advantage of the method of the invention is that when any of the operations of a device can be remote-controlled, the remote control unit used can be the WAP client comprising means for connection to the piconet. Thus, the remote controlled device comprises means for connecting to the piconet and, further, this device is used as a WAP server in the piconet to make the remote control possible.

In the following, the present invention will be described in more detail with reference to the appended drawings, in which

BRIEF DESCRIPTION OF THE DRAWINGS

FIG. 1 shows a local area network system applying the method of the invention, in a reduced schematic diagram, FIG. 3b shows the operation of the transport protocol of a communication device applying the method of the invention, in a reduced layer model and a block chart.

DETAILED DESCRIPTION OF THE PREFERRED EMBODIMENT

Figure 4:
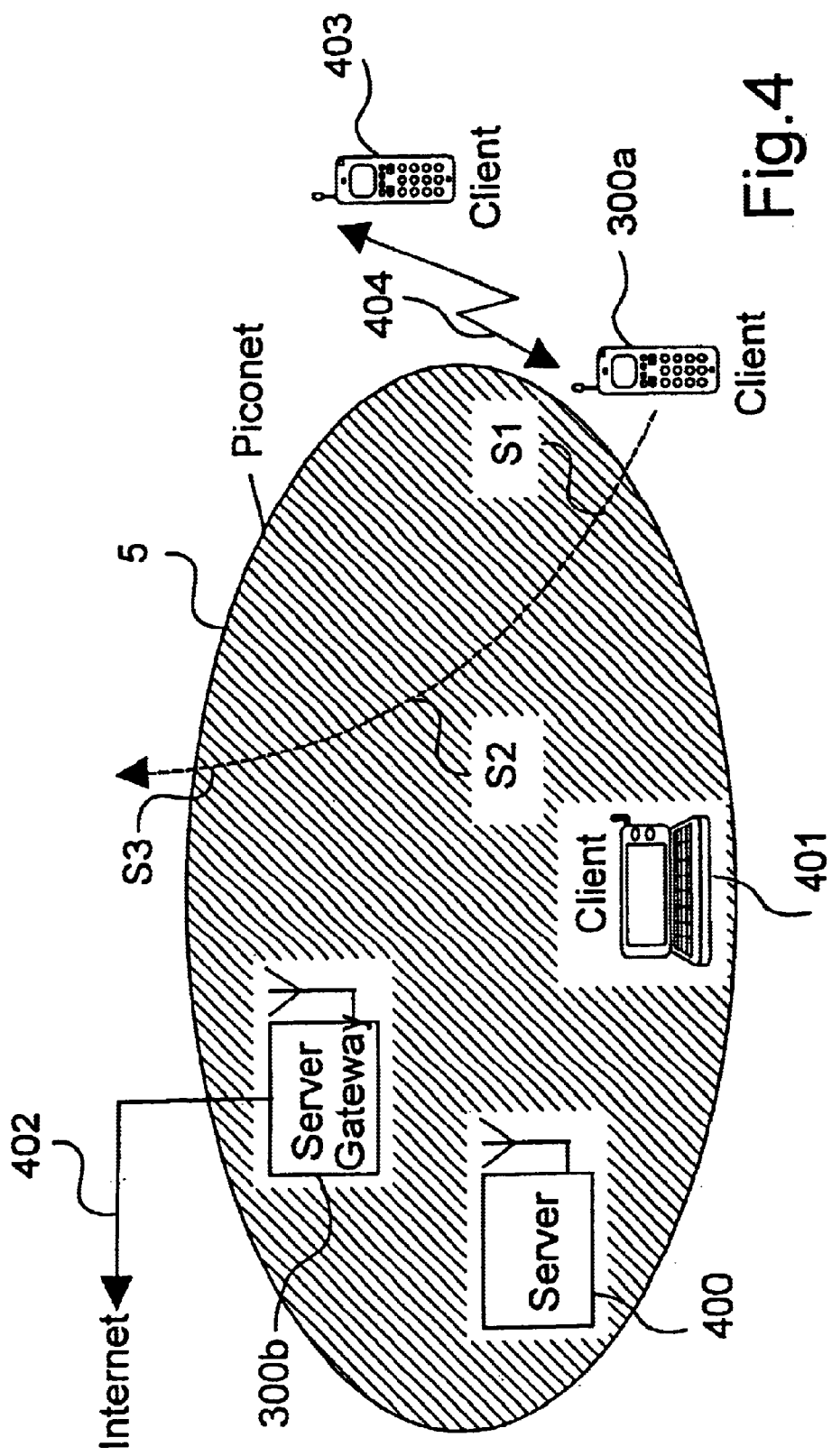
FIG. 4 shows the operation of communication devices applying the method of the invention and a local area network, by means of a reduced chart on a peripheral device complying with an advantageous embodiment.

FIG. 1 shows a local area network system in a reduced chart. The system comprises a communication device, i.e. a server device 1, such as a mobile station 1, which may comprise for example means 2 for setting up a data transmission connection to a mobile communication network 3 and means 4 for setting up a local area network 5 between the server device 1 and peripheral devices. The server device 1 used can also be a gateway server 401 as shown in FIG. 4, whereby a data transmission connection can be set up via this server device 1 e.g. by means of a cable connection to the Internet network 402. Further, it is obvious that the server device 1, which comprises the means 4 for setting up the local area network 5, can be a different device than the gateway server device 401, which is in that case used as a peripheral device in the local area network 5. The server device 1 can be used in the local area network 5, e.g. in the piconet mentioned earlier, without a connection outside the local area network, whereby it can offer e.g. information services to the other peripheral devices. Moreover, a peripheral device can also be the above-mentioned mobile station, such as a communication device 403 shown in FIG. 4, comprising means 2 for setting up a data transmission connection to the mobile communication network 3. Further, it is obvious that the peripheral device used can be a mobile station which does not operate outside the local area network 5, e.g. in the mobile communication network 3.

Figure 2A:
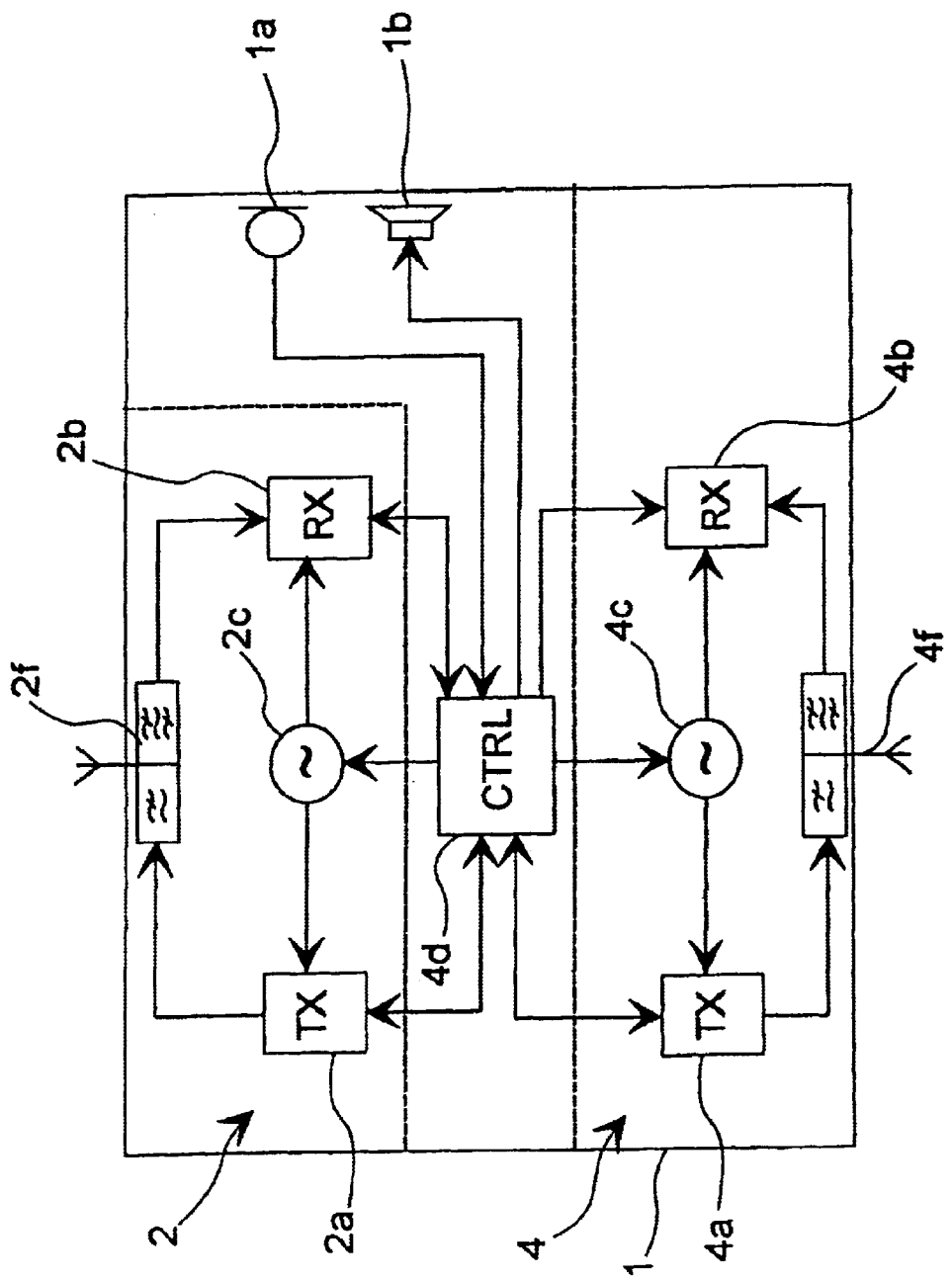
FIG. 2a shows an advantageous embodiment of the hardware applying the method of the invention, in a block chart.

Peripheral devices in the system of FIG. 1 include a printer 6, a telecopier 7, a CDROM reading device 8, a mass memory 9, an auxiliary keyboard 10, an auxiliary display device 11, and a wireless audio user interface 12 provided e.g. with a microphone and an ear piece to be used for example during a call instead of the microphone 1a and ear piece 1b of the mobile station 1 shown in FIG. 2a. As examples, FIG. 1 shows still some other peripheral devices: a video camera 13, a personal computer 14 (Desktop PC) and a portable computer 15 (Laptop PC). In the appended FIG. 1, the printer 6 and telecopier 7 are shown as one device, but they can also be separate devices. It is obvious that the method of the invention is not limited solely to the communication network created by the local area network system presented above, but the invention can be applied also in smaller systems which do not comprise all the peripheral devices 6–15 shown in the system of FIG. 1 or in systems which comprise, for example as shown in FIG. 4, only a server 300b or 400 used as the server 1 and several separate mobile stations 300a, 400 and 403.

Further, with reference to FIG. 1, the mobile station 1, such as a mobile phone, comprises also the means 2 shown in FIG. 2a for setting up a data transmission connection with the mobile communication network 3, means for reading the data on the SIM card of the mobile station and for storing data on the SIM card, a control unit (CU) comprising advantageously a micro controller unit (MCU) and a control logic circuit, such as an application specific integrated circuit (ASIC). Moreover, the control unit is also equipped with a memory, such as a read-only memory (ROM) and a random access memory (RAM). The operation of the mobile station is prior art known as such to a man skilled in the art, wherein its further description will not be necessary in this context.

With reference to FIG. 2a, the means 2 of the server device 1 for setting up a data transmission connection with the mobile communication network 3, i.e. a long-distance link module, comprises i.e. in accordance with the GSM mobile communication system known as such, a radio transmitter 2a, a radio receiver 2b, a local oscillator 2c, a modulator, a demodulator, and an antenna circuit 2f. Nevertheless, the invention is not limited solely to the GSM mobile communication system, but the invention can be applied also in other mobile communication systems. The means 4 of the server device 4 for setting up the local area network 5, i.e. the short-distance link module, comprises e.g. a transmitter 4a and a receiver 4b, such as a radio transceiver, a local oscillator 4c, a modulator, a demodulator, and an antenna circuit 4f. In the server device 1 shown in FIG. 2a, the controller of the short-distance link module of the server device and the controller of the server device are shown as one CTRL control block 4d, but in practical applications they can also be separate.

When the server device 1 is a mobile station, the CTRL control block 4d comprises the above-mentioned control unit CU for controlling the mobile station. The mobile station 1 operating only in the local area network system 5 can be totally without the means 2 for setting up a data transmission connection with the mobile communication network 3.

The changes required by the method of the invention in the communication device 1 can be advantageously implemented by changes made in the above-mentioned CTRL block, for example by changes made in its control program.

Figure 2B:
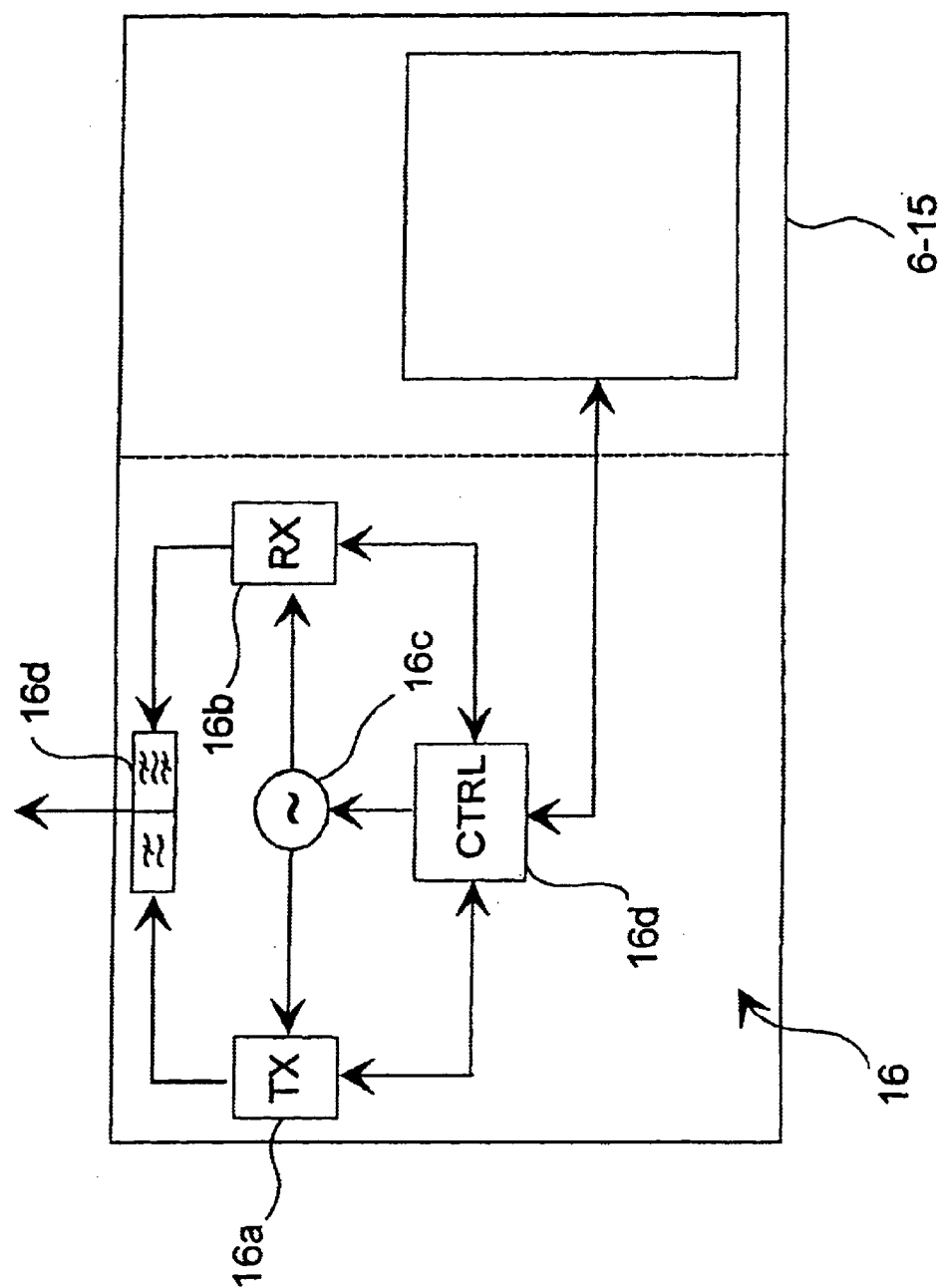
FIG. 2b shows a peripheral device applying the method of the invention, in a reduced block chart.

With reference to FIG. 2b, the peripheral devices 6–15 that can be coupled to the local area network are equipped with a corresponding short-distance module 16, by means of which the peripheral device 6–15 can communicate with the local area network 15, advantageously the server device 1. The short-distance link module 16 of the peripheral device comprises at least a transmitter 16a and a receiver 16b. The short-distance link module 16 comprises further a local oscillator 16c, a modulator, a demodulator, an antenna circuit 16f, and a CTRL control block 16d. An advantageous alternative implementation for the local area network 5 is a short range radio network (SDRF, LPRF), whereby no visual contact or optically reflective contact is required between the server device 1 and the peripheral devices 6–15. Thus, the different peripheral devices 6–15 and the server device 1 can be even in different rooms, on condition that the distance between the server device 1 and the peripheral device 6–15 is within the operating radius of the local area network 5, i.e. the cell. On the basis of the description above, it is also obvious that the peripheral device used can only be a wireless communication device operating in said local area network 5.

In the following description, the WAP application protocol described earlier is used as an example of data transmission protocols to illustrate the method according to the invention described here. The WAP clients and WAP servers mentioned in the following description refer advantageously to clients and servers of the communication network applying the WAP application protocol. Naturally, it is obvious that the invention can be applied within the scope of the claims also in connection with another application protocol, whereby the WAP indication mention in this description is used to refer to the use of this application protocol.

With reference to FIG. 4a, the protocol stack of the layer model of an advantageous WAP compatible system (WAP protocol stack) contains the following layers, listed from the top layer downwards:

- a wireless application layer, i.e. WAP application layer 301a and 301b, comprising at least a wireless mark-up language browser (WML browser) and a WMLS interpreter, as well as telephony value-added services (TeleVAS services) and possibly other services,
- a wireless session protocol (WSP) 302a and 302b,
- a WTLS layer 304a and 304b, and
- a wireless transport protocol layer (WTP), i.e. WTP transport protocol 303a and 303b.

With the layer model, reference is made advantageously to the ISO/OSI layer model for describing different functions. The upper layers of the WAP architecture (wireless application layer, WSP layer, WTLS layer) are independent of the communication network used, but the WTP layer 303a and 303b must be applied on the basis of the particular requirements of the communication method used at the time, e.g. the GSM network or the LPRF or IR network. In the WAP application layer 301a and 301b, the architecture of the wireless application environment (WAE) is applied, where the different communication network services are based on the use of the wireless transport protocol (WTP) and the wireless session protocol (WSP), which also creates the general framework for the development of wireless devices, such as mobile phones and PDA devices. Moreover, it should be noticed that the WAP architecture is very flexible, and layers can be replaced by other ones. Changes are necessary for example when the application layer uses another presentation format, such as HTML or JavaScript.

WAE applications follow closely the protocol applied in the Internet World Wide Web network, where applications, services and information are given in standardised presentation formats which are browsed e.g. by means of known WWW browsers. Thus, the servers and information of the WWW network are provided with a uniform resource locator (URL) address complying with the Internet standard and irrespective of location, and the information presentation format is one supported by the browser, e.g. Hyper Text Markup Language (HTML) or JavaScript. For browsers to be able to communicate with servers of the communication network, also standardised data transmission protocols are needed, the most common of which is the HyperText Transport Protocol (HTTP) used in the WWW network. Consequently, the WAE architecture uses URL addressing according to the WWW standard, and with applications complying with the WAE architecture, it is possible to use also services of the WWW network simultaneously taking into particular consideration the special properties of the wireless communication devices and the wireless communication network.

For retrieving information via the communication network, the communication device needs a WML browser and a HTTP WWW server coupled to the communication network, whereby the browser transmits a request to the selected server for retrieving the desired information, which is identified with the URL address. This information is given e.g. in the WML language which can be compared with the HTML language. After obtaining the information, it is possibly subjected to WML/HTML conversion and presented to the user by means of the application used. Usually, also the URL addresses stored in the URL register of the communication device can refer to local services, such as TeleVAS functions of the device itself, or to remote services, such as information of a server in the WML form. The URL register of the device contains advantageously a collection of URL addresses of known services.

Said TeleVAS services include answering an incoming call, setting up a call, cutting off a call, and transfer of a call. For example certain TeleVAS functions use URL local addresses, which can be e.g. in the form DEVICE://FILE/FUNCTION, and certain TeleVAS functions use URL remote addresses, such as HTTP://TELEVAS.DOMAIN/FILE/FUNCTION, for starting services. In the WAP system, for example, a call is set up by setting up a connection to an HTTP address, and the voice mail system utilises both local and remote addresses which are similar to those described above.

Figure 3A:
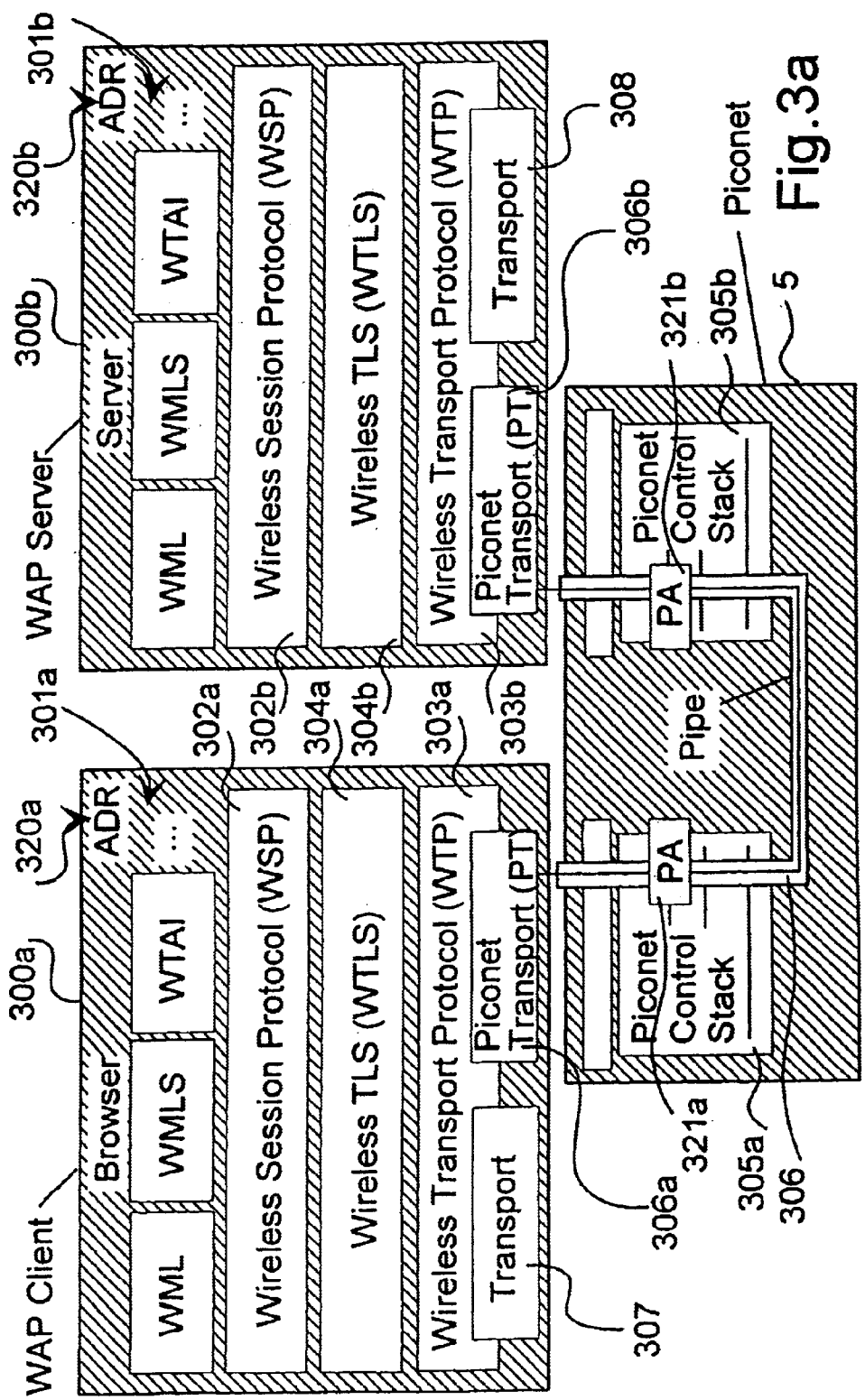
FIG. 3a shows data transmission between two communication devices applying the method of the invention, by means of a reduced layer model and a block chart.

With reference to FIG. 3a, the requests of WAP applications are transmitted via the WSP layer 302a which assists in the data transmission by the WAP layer 301a and is used as a general base for transferring information between the WAP client 300a and the WAP server 300b, for conducting push-type data transmission initiated by the server 300b or for optimising data transmission. If necessary, the information is secured by the WTLS layer 302a and 304a (Wireless Transport Layer Security), serving the task to offer the facilities for this purpose. The WSP session protocol offers a connection point to the transfer protocols of the upper layers and sets up a mapping between the WAP and the Internet architectures and particularly between the WTP and the Internet transport protocols. Communication between the different layers takes place by means of so-called abstract service primitives which describe information exchange and control between the transport layers 303a and 303b and the adjacent layers in the architecture.

The WTP transport protocol of the WAP architecture forms a protocol family for the WTP layer 303a. The WTP layer 303a operates above the data transmission services, offering its services to the upper WSP and WTLS layers 302a and 304a, simultaneously making transparent data transmission possible. The WTP transport protocol comprises a WTP/T protocol which is intended primarily for connection-oriented data transmission, and a WTP/D protocol which is intended primarily for the transfer of datagrams, i.e. data packets containing the destination address and the information to be transmitted. The WTP/D (also called WDP, Wireless Datagram Protocol) is a simple transfer protocol which transfers the protocols of the WAP application layers 301a and 301b as well as the packet information in an unchanged, i.e. transparent, form from the client 300a to the server 300b, and vice versa. The WTP/T is optimised particularly for wireless data transmission services with a limited frequency band. The purpose of WTP protocols is to set up a common connection for different physical transport mechanisms used in different communication networks, which also have different frequency bands. The communication networks can be based on full-duplex, half-duplex or simplex technologies. It is also a purpose of the WTP protocols to be compatible with the corresponding transport layer of the TCP/IP and UDP transport protocols. Moreover, it is another purpose of the WTP protocols to offer the protocols of a higher level a connection based on the port, i.e. connection point, whereby it is possible to take into account the different properties of different devices and their applications.

Further, with reference to FIG. 3a, the nodes, i.e. WAP clients, WAP servers and gateway WAP servers can announce their existence in the area of the piconet 5 by registering as services (piconet services) in a piconet protocol stack 305a and 305b. According to an advantageous embodiment, the piconet has the nature of a temporary, ad hoc communication network, whereby the nodes are not registered in a certain server used as a base station in the piconet. Thus, registration in the network means that the node monitors communication in the piconet and is ready to reply to inquiries relating to the identifications of its device and services. Thus, also with reference to FIG. 3a, the piconet protocol stack 305a is formed in the device of the client 300a, and the piconet protocol stack 305b is formed in the device of the client 300b. When new nodes are detected in the piconet 5, the WAP servers, such as the server 300b, can inquire if they are used as WAP clients. Also, if WAP clients, such as the client 300a, enters the piconet, they can inquire if the other nodes are used as WAP servers or gateway WAP servers.

According to the presentation above, the piconet protocol stack makes it at least possible that the piconet node announces the services supported by this node and a node in the piconet detects which services are supported at each node of the piconet. In addition, the protocol stack advantageously makes connectionless and connection-oriented data transmission possible between different nodes in the piconet. Advantageously, the piconet makes it possible to transmit information relating to WAP applications by broadcasting. It is a purpose of the piconet to provide WAP nodes in the piconet a so-called pipe, i.e. a communication channel. By means of a pipe 306, communication can be started by a node which is the WAP client 300a, or a node which is the WAP server 300b.

Advantageously, the piconet makes possible also service announcements by nodes on the services supported by them. Advantageously, the devices of the nodes can announce at least if the device has a WAP compatible protocol stack. Advantageously at this stage the nodes announce if they support operations of the WAP server, the gateway WAP server and/or the WAP client. Further, with reference to FIG. 3a, the pipe 306 of the piconet 5 terminates at the piconet transport block 306a and 306b of the above-described WTP layer 303a, 303b, applying the method of the invention. The WTP transport protocol makes it possible to register and use several data transmission channels in data transmission of WAP applications. Each data transmission channel is provided with a separate transport block, blocks 306a, 306b, 307 and 308 in FIG. 3a, implementing the functions according to channel specifications. It is an aim of the WTP transport protocol to offer a uniform interface for the clients above the same, i.e. for example the WTLS layer 304a, the WSP session protocol 302a and the WAP application layer 301a.

With reference to FIG. 3b, the following is a more detailed description on the operation of the piconet transport (PT) block 306a, 306b applying the method of the invention. The purpose of the PT block 306a, 306b is the mapping of the different functions of the piconet 5 used for the WTP transport protocol, for example the mapping of transactions for the connection-based WTP/T service of the WTP transport protocol and the mapping of datagrams for a connection-based or connectionless WTP/D service. The PT block 306a, 306b is used as an interface so that it utilises the method used by the piconet 5 for identifying other devices, such as devices 300a and 300b offering WAP services, in the piconet 5, and simultaneously conceals this function from the other layers of the WAP stack. This has the advantage that the piconet 5 can be connected with the WAP stack by making only slight changes in the implementation or protocols of the WAP stack, or changes can be totally avoided. Even though the signals 322 of the PT block would not affect the definitions of the WAP application protocol, they still have an effect on the servers and clients wishing to conduct different automatic operations when detecting a server or a client.

Further, with reference to FIG. 3b, the PT block 306a, 306b comprises firstly mapping functions 310 and 311 which map WTP services 316 and 317, such as WTPID and WTP/T, for native services 318 of the piconet 5 (WTP/T—Piconet Mapping, WTP/D—Piconet Mapping). Secondly, the piconet control unit (PCU) 312 takes care of the differences in the piconet 5 and the WTP transport protocol, particularly relating to differences in addresses and data service set-ups. Advantageously, the PCU control unit 312 is capable of signalling 322 on transactions relating to the usability of WAP devices 300a and 300b in the piconet 5. Typically, the PCU control unit 312 processes transactions relating to the dynamic properties of the piconet 5. ASP mentioned in FIG. 3b refers e.g. to logical protocol operations 313, 314 and 315 (abstract service primitives) which are included also in the upper and lower interfaces of all layers in the stack and through which the clients, i.e. for example the WTLS layer 304a, the WSP session protocol 302a and the WAP application layer 301a, use the services, i.e. for example from point to point WTP/T and WTP/D transport services 316, 317 and other transport services 319. In addition to this, ASP operations are included in the upper and lower interfaces of all layers in the stack. Arrows illustrated between the blocks in FIG. 3b indicate the transfer of information between these blocks.

In the following, the operation of said mapping functions 310 and 311 will be discussed in an advantageous embodiment of the method of the invention. The quality of service in the piconet corresponds to or is better than the quality of service according to the WTP transport protocol. If the quality of service is better, the WTP/D and WTP/T transport service is only used as a reliable transaction service in connectionbased data transmission of the stream data service of the piconet. WTP services are used for connectionless data transmission of the stream data service of the piconet in case broadcast-type data transmission is involved in the area of the piconet. Table 1 presents a summary of the mapping of transport services between WTP services and the services of the piconet.

TABLE 1

| WTP service | Piconet service |
| --- | --- |
| WTP/S Stream Service | Connection-based data service or virtual network |
| WTP/T Transaction Service | Connection-based data service or virtual network |
| WTP/D Datagram Service, Point-to-point | Connection-based data service or virtual network |
| WTP/D Datagram Service, Broadcast | Connectionless data service |

In the following, the operation of the above-mentioned PCU control unit 312 will be described. It should be noticed that nodes enter and leave the network continuously, whereby the PCU control unit must take care of the resulting differences between the piconet and communication networks based on a conventional cellular system. In cellular networks, the nodes, i.e. mobile stations, are registered in the network and move in the area of different cells continuously, simultaneously maintaining the data transmission connection. The addresses of the nodes of the WAP services are for example MSISDN numbers, IP addresses (Internet Protocol), or X.25 addresses.

The MSISDN number corresponds to a standardised PSTN (public switched telephone network) or ISDN (integrated services data network) number, and it consists of a "+" code, an NDC code (national destination code) and a mobile subscriber specific number. In some cases, the MSISDN number does not indicate a single mobile subscriber but a certain WAP server or gateway WAP server which communicates with a short message switching centre (SMSC). Some other address alternatives are also shown in Table 2.

TABLE 2

| Data transmission mode | Address |
| --- | --- |
| UDP/IP: CDPD, CSD circuit switched data transmission and GPRS | 16 bit source and destination port number of UDP header, 32 bit source and destination IP address of IP header |
| GSM SMS-PP | 16 bit source and destination port number of UDH header, source and destination MSISDN number, SMSC address (MSISDN) |
| UDP: IS-136 GUTS/R-Data | 16 bit source and destination port number of UDP header, 4 bit protocol identification of GUTS header with 4 bit message type, 32 bit source and destination IP address of R-Data layer with routing information |
| X.25 | X.25 compatible address |

The data of WTP services is transferred via a connectionless or connection-based piconet data service, wherein the address details of the WTP application, such as the port addresses of the WTP service, are processed and transferred as data. It can be said that different port addressings of WTP services are multiplexed by means of one connectionless or connection-based data service link between nodes of the piconet, wherein in the WAP application protocol, several communications of different services can take place simultaneously and they are all channelled into a common piconet pipe.

The addresses used by the piconet for the nodes differ from those used by the WAP application protocol, wherein it is necessary to map an address used by the WAP application protocol for a corresponding address used by the piconet or a temporary address created by the piconet. When the WAP node moves out from the piconet, the address used by it no longer refers to this node, wherein e.g. bookmarks of the WML browser refer to a node that is no longer accessible in the piconet. If the node used is a WAP server or a gateway WAP server, the mapping of the addresses is easy, because these nodes typically have their individual MSISDN or Internet-based addressed that is used also in the WAP application protocol. Thus, bookmarks referring to these WAP nodes are valid also later on.

With reference to FIG. 4, the following is a description on data transmission initiated by a client 300a applying the method of the invention (WAP client) in a piconet 5. When the WAP client 300a enters the coverage area, i.e. cell, of the piconet 5 (stage S1), it detects the WAP server 300b (gateway) or servers of the piconet 5. Thus, the PT block 306a of the WAP client 300a inquires the data needed by the WAP application protocol from the network 5, to make data transmission between two WAP systems possible. In the inquiries, functions of the piconet 5 are utilised. The inquired data contain an individual identification (ID) that can be used for identifying the WAP server system 300b. If the WAP server system 300b has a standardised Internet address, such as a domain name, this address will be used. The application of the WAP client 300a can automatically retrieve the home page of the WAP server 300b to the user of the device of the WAP client 300a, or it confirms a search request from the user. If necessary, the user can select the WAP server to be used, such as 300b and 400, if several servers are available in the piconet 5. The functions depend also on the WAP application used, and the WAP client 300a is not expected to act in any predetermined way, e.g. for using services of the WAP applications of the servers 300b and 400. The WAP client 300a can start communication with the WAP server 300b, e.g. for retrieving information from the server, because the identification ID or Internet address of this server is available to it. Also the WAP server 300b has at this stage (stage S2) detected the entry of the WAP client 300a in the piconet, whereby it is possible to start for example push-type data transmission services with the WAP server 300b.

When the WAP client 300a leaves (stage S3) the piconet 5, communication between the WAP client 300a and the WAP server 300b or 400 is no longer possible by means of the piconet 5. However, if the WAP server 300b has an Internet address or a MSISDN address, the WAP client 300a can set up a data transmission connection to this server via another piconet or a cellular network, such as a mobile communication network. Thus, it is a requirement that the WAP server 300b is coupled e.g. to the Internet network 402 and further via the Internet network to said second cellular network or piconet. Another requirement is that the device of the WAP client 300a can communicate with said cellular network, piconet, or both. Advantageously, the client 300a comprises the means, described earlier, for setting up a data transmission connection to the mobile communication network 3, wherein, as shown in FIG. 4, the client 300a can communicate 404 also with the communication device 403, such as a mobile station.

Further with reference to FIG. 4, the following is a description on data transmission initiated by a server 300a or 400 (WAP server) applying the method of the invention in a piconet. The piconet WAP clients 401, WAP servers 400 or gateway WAP servers 300b detect the entry of the WAP client 300a in the piconet 5. Thus, the WAP client 300a is inquired for the data needed by the WAP application protocol, so that communication between two WAP systems is possible. The inquiry is conducted by functions of the piconet 5. The data inquired comprise an individual identification (ID) that can be used for identifying the WAP client system 300a. If the WAP client system 300a has a standardised Internet address, such as a domain name, this address will be used. The application of the WAP server 400 can greet the WAP client 300a entering the piconet 5 e.g. by sending the home page, advertisement information, or instructions. It will depend on the application to be used what information is transmitted and how the information is utilised. The functions depend also on the WAP application used, and the WAP server is not expected to act in any predetermined way e.g. for setting up a data transmission connection with the WAP client.

When the WAP client 300a leaves the piconet (stage S3), communication between the WAP client 300a and the WAP server 400 or 300b is no longer possible by means of the piconet 5. However, if the WAP client 300a has an individual Internet address or a MSISDN address, the WAP server can set up a data transmission connection with this client via another piconet or cellular network, such as a mobile communication network. Also in this case it is required for example that the WAP server is coupled to the Internet network, such as the WAP server 300b in FIG. 4, and the WAP client 300a is coupled to a cellular network.

In an advantageous embodiment of the method according to the invention, mapping is conducted in the following way. The PCU control unit of the WAP node initiating the data transmission inquires from its host system for service parameter (SP) information. If the attribute information of the service parameters contains address information (320a, 320b), i.e. so-called ADR information, the node associates the WAP node with this address information (320a, 320b). The aim is to link ADR information and the original address of the WAP node used by the piconet, i.e. the network address.

When the WAP node transmits information through the WTP layer to a system, whose ADR information corresponds to the address information of the transmission, the information is transmitted to the piconet WAP node to which the ADR information is associated or linked. If there is a gateway WAP server node in the piconet, the information can be transmitted to this node to be transmitted outside the piconet, if this is desired by the transmitting PCU control unit.

If address information relating to the SP parameters is not available in the host system of the WAP node, the PCU control unit, in an advantageous embodiment of the method according to the invention, creates a dummy address (DA) reserved for the WAP node on the basis of e.g. the name or network address of the host device. It is possible that the node in question does not support Internet and MSISDN addresses. This DA address can be used in the same way as other, real Internet and MSISDN addresses used by WAP browsers. The PCU control unit links the DA address and the network address of the WAP node in question, used by the piconet.

When the WAP node receives information via the piconet, the PCU control unit of the receiving device checks if address mapping should be conducted. If the WAP node used is a gateway WAP node, its WAP protocol stack will check the address data from the information received. If the address data refers outside the piconet and the WAP node, the WAP node is used in a known manner as a gateway and it transmits an inquiry to the Internet, to the address in question.

Next, the service parameters (SP), mentioned earlier, will be discussed. Service parameter information is used in the PCU control unit in connection with address mapping and creating data transmission connections for data services in the piconet. Table 3 shows examples of service parameter formats for the IR communication network. The parameters shown in Table 3 must be modified e.g. for LPRF communication networks.

TABLE 3

| Parameter, class | Attribute | Denotation |
| --- | --- | --- |
| "WAP" | "Role" | Server and/or gateway and/or client |
| "WAP:Client" | "IrLMP:TinyTP:LsapSel" | Dynamic address of the WAP client in the piconet service multiplexer interface (IrLMP) |
| "WAP:Client" | "Parameters" | Octet sequence that represents all the WAP parameters for client |
| "WAP:Server" | "IrLMP:TinyTP:LsapSel" | Dynamic address of the WAP client in the piconet service multiplexer interface (IrLMP) |
| "WAP:Server" | "Parameters" | Octet sequence that represents all the WAP parameters for server |
| "WAP:Gateway" | "IrLMP:TinyTP:LsapSel" | Dynamic address of the WAP client in the piconet service multiplexer interface (IrLMP) |
| "WAP:Gateway" | "Parameters" | Octet sequence that represents all the WAP parameters for gateway |

Said octet sequence at the bit level can comprise several different parameters, the most important being presented in Table 4. In addition to the presented parameters relating to mapping, it is possible to use e.g. parameters relating to device names.

TABLE 4

| Identification, | Length, LEN | Value, VAL | Denotation |
| --- | --- | --- | --- |
| 0x00 | variable | OCTETSEQ | Bit 0: WTP/D supported<br>Bit 1 . . . 7: Reserved<br>Bit 8: WTP/T: Class I supported<br>Bit 9: WTP/T: Class II supported<br>Bit 10: WTP/T: Class III supported<br>Bit 11: WTP/T: Class IV supported<br>Bit 12 . . . : Reserved |
| 0x10 | variable | STRING | MSISDN of the Service Center (e.g. SMSC), "+358105051" |
| 0x11 | variable | STRING | MSISDN of the WAP node, "+358105051" |
| 0x20 | variable | STRING | IP address of the WAP node |
| 0x21 | variable | STRING | IP address of the WAP node in the dotted presentation, "127.0.0.1" |
| 0x22 | variable | STRING | IP address of the WAP node as domain name, e.g. "www.nokia.com" |
| 0x23 | variable | STRING | Subnetwork mask, subnetworks indicated by the gateway WAP server and to which access is provided |

Next, the data service setup (DSS) of the PCU control unit will be discussed. DSS functions are conducted when the WAP node wants to communicate with a WAP host system, in other words, a WAP client with a WAP server, or vice versa. When the WAP protocol stack requests the TP block to communicate with the WAP host system, it is a task of the PCU control unit to create a data service between these two nodes of the piconet. In case of the WTP/T or WTP/D service, the nodes can also be closed by the PCU control unit, if data transmission between these nodes does not take place within a predetermined time. In case of the WTP/S service, the data transmission connection is kept continuously open. Because of long set times of timers monitoring the data transmission connection, operation delays in upper layers of the protocol stack are possible, whereby the data transmission connection does not need to be cut off and reset.

The PCU control unit transmits advantageously to the WAP node a signal on different transactions in the network. For instance, upon the entry of a new WAP client in the piconet, a signal is transmitted, equipped with the address data of the new device. When the WAP node is a WAP server, a signal can be used for informing the WAP client about the fact that there is a new WAP server available for the WAP client in the piconet. It is also possible that the PCU control unit transmits a signal relating to the leaving of the WAP node from the piconet. The above-mentioned signal is used as a sign for the WAP node that it must route a data transmission that was running in the piconet and was cut, or start a new data transmission e.g. via a mobile communication network.

Figure 5:
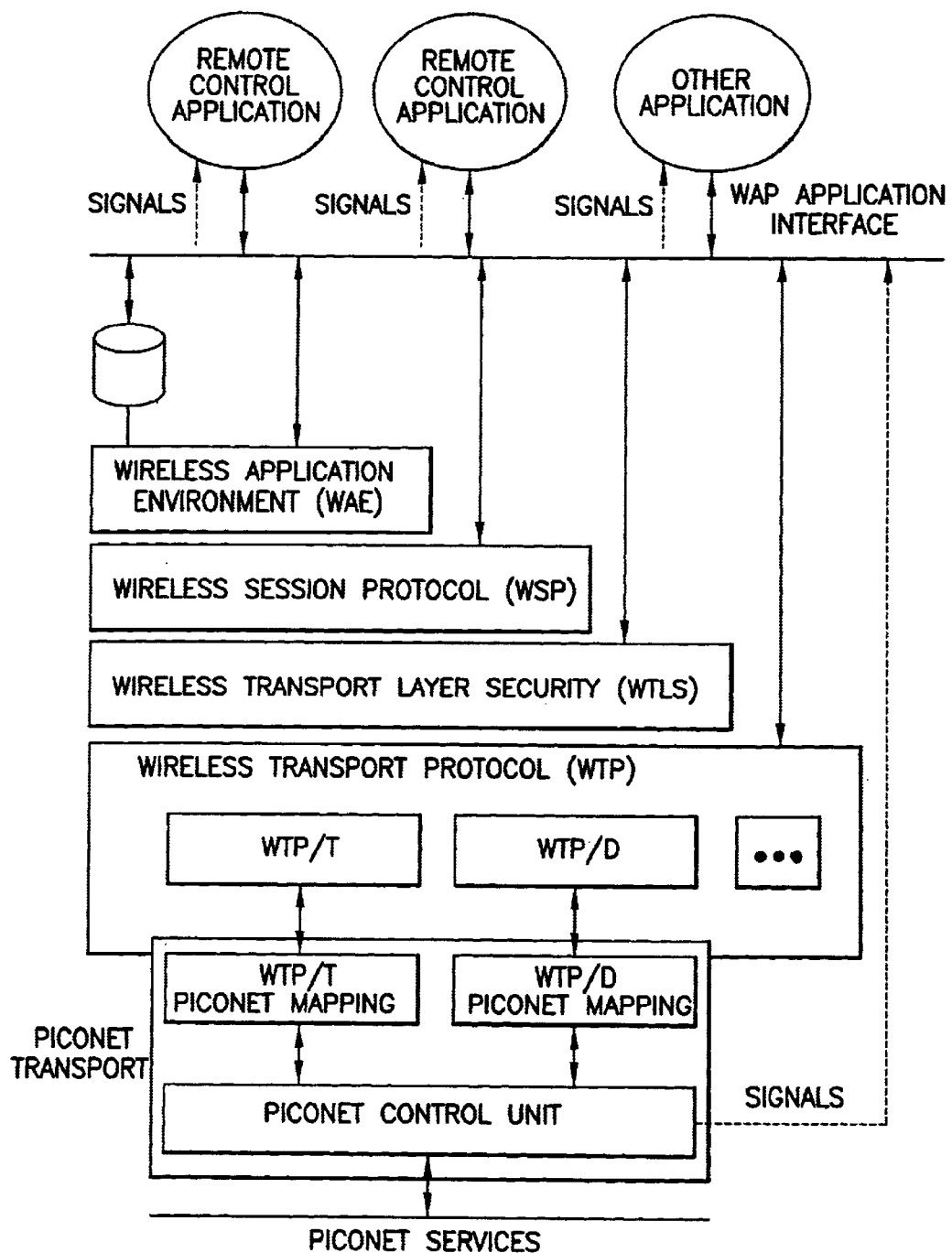
FIG. 5 shows the operation of a communication device applying the method of the invention, in a reduced manner by means of a layer model and a block chart.

Further, FIG. 5 is a schematic diagram showing the implementation of remote control applications in a reduced schematic diagram, illustrated with the layer model. For implementing these remote control applications, as well as also other applications, as general services via a server, the different remote control applications must be provided with a connection, i.e. an interface (WAP application interface). Advantageously, applications in the interface receive information (signals) about detecting new clients, their leaving from the area of the piconet, or other transactions in the network. In this interface, a service can for example change the home page used by the WML browser of the WAP server so that one link is formed by a link to the remote control application, i.e. to the remote control page; that is, for example a CDROM terminal installed in the data processor used as the server is being controlled.

The present invention is not limited solely to the examples given above, but it can be modified within the scope of the appended claims. For example, it is obvious that the services used can be e.g. information that is referred to by using a URL address, such as time tables or the like, a WAP compatible protocol, or that the communication device can act as a WAP client or a WAP server. Similarly, information relating to services or address information, to be transmitted to other communication devices, can contain e.g. above-mentioned information, a URL address, or a reference to a memory space.

What is claimed is:

1. A method for setting up a data transmission connection which is formed for transmitting information between at least a first communication device and a second communication device, the method comprising:

selecting a network address for the first communication device, for identifying the first communication device;

forming address information for at least one service of the first communication device, the address information being used for identifying the service; and arranging a correspondence between the network address of the first communication device and the address information of the service, for transferring information between the first communication device and the second communication device, wherein the second communication device is a device connected to a local area network having a coverage area for wireless communication, and the first communication device is a mobile station entering said coverage area for setting up said data transmission connection, and wherein said network address is a network-specific address selected upon the first communication device entering said coverage area and reserved for the first communication device for use within said coverage area, and wherein the method further comprises the step of using said correspondence for mapping said network address and said address information of the service.

2. A method according to claim 1, further comprising transmitting information on the network address of the first communication device from the first communication device to the second communication device.

3. A method according to claim 2, further comprising transmitting information on said service from the first communication device to the second communication device.

4. A method according to claim 1, further comprising transmitting information on the services of the second communication device to the first communication device on the basis of the network address of the first communication device.

5. A method according to claim 1, wherein at least the second communication device is equipped with means for selecting the network address and arranging said correspondence.

6. A method according to claim 1, further comprising formulating the network address by utilising one or more of the address information, name, identification code, unique identification code, reserved name, temporary name, standardised address, temporary address of the communication device or a service, or another network address of the data transmission connection.

7. A method according to claim 1, further comprising using a short-range radio network, infrared network, or inductive network for setting up the data transmission connection, and wherein the communication device is a mobile station.

8. A method according to claim 1, further comprising setting up a second data transmission connection from the first communication device to a communication network, for transmitting information between said communication network and the second communication device.

9. A method according to claim 1, further comprising forming also a second data transmission connection between the first communication device and the second communication device, for continuing the transmission of information by utilising this second data transmission connection.

10. A method according to claim 9, further comprising implementing the second data transmission connection by means of a mobile communication network.

11. A method according to claim 1, wherein the address information is a URL address or an address referring to a memory space.

12. A method according to claim 1, further comprising multiplexing several data transmission connections between the first communication device and the second communication device in a common communication channel to be formed.

13. A method for setting up a data transmission connection which is formed for transmitting information between at least a first communication device and a second communication device, the method comprising:

selecting a network address for the first communication device, for identifying the first communication device;

forming address information for at least one service of the first communication device, the address information being used for identifying the service;

arranging a correspondence between the network address of the first communication device and the address information of the service, for transferring information between the first communication device and the second communication device; and inquiring service parameter information of the first communication device, and forming said address information of the service by utilising the information contained in said parameters.

14. A method for setting up a data transmission connection which is formed for transmitting information between at least a first communication device and a second communication device, the method comprising:

selecting a network address for the first communication device, for identifying the first communication device;

forming address information for at least one service of the first communication device, the address information being used for identifying the service;

arranging a correspondence between the network address of the first communication device and the address information of the service, for transferring information between the first communication device and the second communication device;

inquiring service parameter information of the first communication device, and forming said address information of the service by utilising one or more of name, identification code, unique identification code, reserved name, temporary name, standardised address, temporary address of the communication device or a service, or a network address of the data transmission connection, if there is no information available in said parameters.

15. A communication device, which first communication device comprises:

means for setting up a data transmission connection and for transmitting information between the first communication device and at least a second communication device means for selecting a network address, which network address is arranged to identify said first communication device, means for forming address information for a service, the address information being arranged to identify said service, means for arranging a correspondence between the network address and the address information; and means for determining service parameter information of the first communication device, and for forming said address information of the service by utilising the information contained in said parameters.

16. A communication device according to claim 15, further comprising:

first means for transmitting information relating to the network address of the first communication device, and second means for receiving information relating to services or the address information of the first communication device.

17. A communication device according to claim 16, wherein the first means are also arranged for transmitting information relating to services or the address information to at least the second communication device.

18. A communication device according to claim 16, wherein the second means are also arranged for receiving information relating to the network address.

19. A communication device according to claim 15, further comprising means for forming the network address by utilising one or more of the address information, name, identification code, unique identification code, reserved name, temporary name, standardised address, temporary address of the communication device or a service, or another network address of the data transmission connection.

20. A communication device according to claim 15, wherein the first communication device is arranged to operate in a short-range radio network, infrared network, or inductive network.

21. A communication device according to claim 15, further comprising means for forming the address information by utilising name, identification code, unique identification code, reserved name, temporary name, standardised address, temporary address of the communication device or a service, or a network address of the data transmission connection.

* * * * *